United States Patent [19]

White

[11] 4,356,290

[45] Oct. 26, 1982

[54] BLOCK POLYMERS OF POLYPHENYLENE OXIDE AND AROMATIC POLYFORMALS

[75] Inventor: Dwain M. White, Schenectady, N.Y.

[73] Assignee: General Electric Company, Schenectady, N.Y.

[21] Appl. No.: 220,662

[22] Filed: Dec. 29, 1980

[51] Int. Cl.³ .................... C08G 81/00; C08G 65/38
[52] U.S. Cl. ................... 525/397; 525/390; 525/534
[58] Field of Search .............. 525/390, 397, 534; 528/219

[56] References Cited

U.S. PATENT DOCUMENTS

| | | | |
|---|---|---|---|
| 3,069,386 | 12/1962 | Barclay | 525/534 |
| 3,703,564 | 11/1972 | White | 525/397 |
| 4,238,584 | 12/1980 | White | 525/534 |

*Primary Examiner*—Wilbert J. Briggs, Sr.
*Attorney, Agent, or Firm*—Peter A. Bielinski; Joseph T. Cohen; James C. Davis, Jr.

[57] ABSTRACT

Linear, branched, and/or cross-linked block polymers of polyphenylene oxides and aromatic polyformals. These block polymers can be molded, calendered, or extruded as films, sheets, fibers, laminates or other useful articles of manufacture.

7 Claims, No Drawings

BLOCK POLYMERS OF POLYPHENYLENE OXIDE AND AROMATIC POLYFORMALS

BACKGROUND OF THE INVENTION

1. Field of the Invention

This invention relates to linear, branched, and/or cross-linked block polymers of polyphenylene oxides and aromatic polyformals. These block polymers can be molded, calendered, or extruded as films, sheets, fibers, laminates or other useful articles of manufacture.

2. Description of the Prior Art

Bis(polyphenylene)-carbonate block copolymers having a limited carbonate segment number average molecular weights, e.g. 250 to 5500, are well known and are described in U.S. Pat. No. 3,875,256. These polyphenylene oxide aromatic carbonate block copolymers are formed by the reaction of carbonyl halides or bishaloformates e.g., phosgene or bis-chloroformate, respectively, with polyphenylene oxide in the presence of a hydrogen halide acceptor e.g. an alkali metal hydroxide, an alkaline earth metal hydroxide or oxide or a tertiary amine.

Polyphenylene oxides having an average hydroxyl group per molecule of 1.0 or less, are described in A. S. Hay's U.S. Pat. Nos. 3,306,875; 3,914,266; 4,028,341 and polyphenylene oxides having an average hydroxyl group per molecule greater than zero including 2.0 or less are described in D. M. White's 4,140,675 and 4,234,706 among others.

DESCRIPTION OF THE INVENTION

This invention embodies linear, branched, and/or cross-linked block polymers of polyphenylene oxides and aromatic polyformals.

In general, illustrative of the braod group of block polymers included within the scope of this invention are those described among others by the following model structures

| | |
|---|---|
| (I linear) | AZC, BZC, AZCZA, AZCZB, BZCZB, AZCZBZCZA, AZCZBZCZCZB, etc., etc. etc. |
| (I branched) | B   C C   B C   A     C<br>AZC, AZBZA, AZBZA, AZCZBZBZA, etc., etc., etc. |
| (I cross-linked) | C     A<br>AZBZCZA, CZBZCZ, etc., etc., etc.<br>C   B   C<br>AZBZCZBZC, AZBZCZA<br>A |

The above illustrative linear, branched, and cross-linked combinations of polyphenylene oxide and aromatic polyformals including random and/or alternating arrangements of polymer units defined by the units A, B, C, or coupling agent Z, which units and coupling agents are described in greater detail hereafter are not intended to limit the combinations that can be obtained by the practice of this invention since the block polymer combinations of this invention are limited only by the amount of block polymer precursors charged to the reaction medium in carrying out the process of this invention. Presently preferred block polymers of polyphenylene oxide and aromatic polyformals are linear block polymers wherein the coupling agent of the polymer backbone is a bifunctional coupling agent. Even more preferred are linear polymers containing substantial amounts of aromatic polyformal units, i.e. amounts sufficient to provide aromatic polyformal segments which comprise from about 1 to 99 percent, preferably from about 10 to 90 percent, by weight of the total weight of block polymer.

The expression polyphenylene oxides includes "monofunctional polyphenylene oxides" well known to those skilled in the art having an average hydroxyl group per molecule value greater than zero including 1.0 or less. These polyphenylene oxides can be prepared by any of the methods of the prior art, and may be illustrated by formula (II) set out hereinafter:

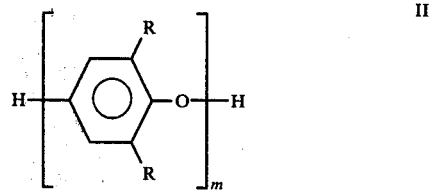

wherein independently each R is hydrogen, a hydrocarbon radical, a halohydrocarbon radical, a hydrocarbonoxy radical or a halohydrocarbonoxy radical, m is a number of at least 1, preferably 10, and more preferably 40 to 170. The monofunctional polyphenylene oxide units of the block polymers can be conceptualized by the structure of formula (II) above wherein the hydrogen atom is disassociated from the monohydroxy group of the polyphenylene oxide, i.e., a phenoxy radical, which may be referred to as a monovalent phenoxy radical, abbreviated herein by the formula —A.

The expression "polyphenylene oxide" also includes "polyfunctional polyphenyelene oxides" also well known to those skilled in the art including quinone-coupled polyphenylene oxides having an average hydroxyl group per molecule greater than zero including 2.0 or less. These polyphenylene oxides can be prepared by the methods described in U.S. Pat. No. 4,234,706 and can be illustrated by formula (III) set out hereafter:

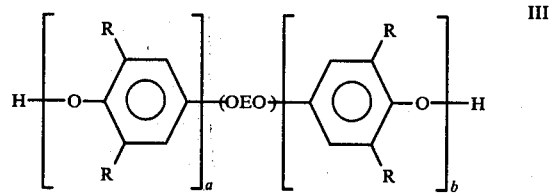

wherein independently $-(OEO)-$ is a divalent quinone residue, E is a divalent arene radical, either a or b is at least equal to 1, the sum of a plus b is preferably at least equal to 10, more preferably 40 to 170, R is the same as in formula (II) above. The polyfunctional polyphenylene oxide units of the block polymers can be conceptualized by the structure of formula (III) above wherein the hydrogen atoms are disassociated from the hydroxy groups of the quinone-coupled polyphenylene oxide, i.e., a quinone-coupled polyphenoxy radical, which may be referred to as a divalent phenoxy radical, abbreviated herein by the formula —B—.

The expression aromatic "polyformals" as employed herein and in the claims includes any polyformals having an aromatic ring directly bonded to an oxymethylene segment of the aromatic polyformal. These aromatic polyformals can be prepared by the methods described in A. S. Hay's U.S. application Ser. No. 958,040 filed Nov. 6, 1978—which methods are incorporated herein in their entirety by reference—and can be illustrated by formula (IV) set out hereinafter:

$$H\text{--}(OR'OCH_2)_n\text{--}OH \qquad \text{IV}$$

wherein n is an integer at least equal to 1, and R' is a divalent aromatic radical. The aromatic polyformals of the block polymers can be conceptualized by the structure of formula (IV) wherein the hydrogen atoms are disassociated from the hydroxyl groups associated with the aromatic polyformals, which may be referred to herein as a divalent aromatic polyformal radical abbreviated herein by the formula —C—.

Although in formula (IV) above the R' is broadly defined as a divalent aromatic organic radical the term "aromatic" as used herein and in the claims includes any of the well known $C_{(6\text{-}25)}$ divalent aromatic radicals, e.g. phenylene, tolylene, xylylene, naphthalene, etc.; halogenated derivatives of such divalent aromatic hydrocarbon radicals, such as chlorophenylene, bromotolylene, etc., divalent radicals, such as —R''QR''—, wherein R'' is selected from $C_{(6\text{-}13)}$ divalent aromatic radicals, wherein Q can be cyclohexyl, fluorenyl, —O—, —S—,

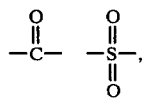

—$C_yH_{2y}$—, y being equal to 1 to 5 inclusive,

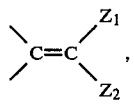

$Z_1$ is selected from hydrogen, chlorine or bromine, $Z_2$ is selected from chlorine or bromine.

The expression "coupling agents" as employed herein and in the claims includes "polyacyl halides", e.g. acyl halides having at least two halide coupling reaction sites. These acyl halides are illustrated by formula (V) set out hereinafter:

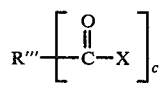

wherein c is a number at least equal to 2, X is a halogen, e.g. fluorine, chlorine, bromine or iodine, preferably chlorine, and R''' is $C_{1\text{-}8}$ alkylene, $C_{1\text{-}8}$ alkenylene, phenylene, halophenylene and $C_{1\text{-}18}$ alkyl substituted phenylene. The coupling agents of the block polymers can be conceptualized by the structure of formula (V) above wherein the halogen atoms are disassociated from the acyl halides. These radicals are abbreviated hereby the symbol —Z—, or

etc.

Illustrative of a portion of presently preferred acyl halides are the acid halides of the following acids: ma-lonic, succinic, maleic, fumaric, itaconic, mesaconic, citraconic, glutaric, adipic, pimelic, suberic, azelaic, trimellitic, phthalic, isophthalic, terephthalic and the above phthalic acids having from one to four halogens, preferably chloro substituents or from one to four $C_{1\text{-}18}$ alkyl substituents. The most preferred phthalic acid halides are unsubstituted and have two chlorine substituents, e.g. isophthaloyl chloride.

In general, the process of preparing polyphenylene oxide aromatic polyformal block copolymers comprises contacting mono and/or polyfunctional polyphenylene oxides, aromatic polyformal block copolymers and coupling agents in the presence of an aqueous solution of a water soluble base and a catalytic phase transfer agent. Any amount of functional (reactive) polyphenylene oxides, aromatic polyformal block copolymers and coupling agent can be employed, e.g. from 1/1000 to 1000 times the stoichiometric requirements required to completely couple all of the reactive polyphenylene oxide and aromatic polyformal block copolymer.

Presently, the process is preferably carried out by introducing a coupling agent to a solution of a polyphenylene oxide and an aromatic polyformal under fluid mixing conditions wherein the liquid reaction medium experiences high fluid shear stress since the process is highly sensitive to the dispersion of the reactants. In a presently more preferred embodiment, the coupling reaction is carried out while introducing the aromatic polyformal solution at a point or region within a reaction environment near a mixing impeller, e.g. an axial-flow or radial flow impeller, such as a marine-type mixing propeller, fan turbine, pitched paddle, curved blade turbine, spiral backswept turbine, flat-blade turbine, gas impeller, anchor impeller, etc., in order to establish and maintain high fluid shear rates and accordingly relatedly high fluid shear stresses. The addition of coupling agent under the aforesaid process conditions facilitates the establishment and maintenance of a substantially uniform dispersion of reactants coupling agent, polyphenylene oxide, aromatic polyformal, water soluble base, and catalytic phase transfer agent, and accordingly optimum process efficiency. In general, process equipment employing high-speed axial-flow impeller mixers are presently preferred in the process.

Advantageously and preferably, the process is carried out employing substantially the exact stoichiometric amounts of coupling agent required to completely couple essentially all of the hydroxyl components associated with the polyphenyl oxide and aromatic polyformal reactants. Preferably, the coupling agent is added to the reaction medium continuously during the course of the reaction so that the exact stoichiometric coupling agent requirements for completion of the coupling reaction are only satisfied as the last portion of coupling agent is added to the reaction medium.

In a preferred embodiment, the process is carried out in the substantial absence of any hydrolyzing agent, e.g. methanol, etc., or any other chemical constituents which can promote undesirable side reactions, e.g. primary or secondary amines. Accordingly, it is highly desirable that individually and preferably collectively any potential hydrolyzing agent content be limited to less than 1%, and more preferably less than ½% based on the weight of polyphenylene oxide and aromatic polyformal reactant.

Any water soluble base can be employed, however, preferably is an aqueous solution of a water soluble base, e.g. an aqueous alkaline metal or alkaline earth metal hydroxide or carbonate solution. Specific examples include aqueous solutions of potassium hydroxide, sodium hydroxide, sodium monocarbonate, barium carbonate, etc. Any amount of water soluble base can be employed. Generally effective mole proportions of water soluble base relative to the amount of coupling agent that are employed are coupling agent:water soluble base proportions of from about 1:100 to about 50:1 and more frequently from about 1:10 to about 10:1.

Any catalytic phase transfer agent can be employed, however, preferably is a phase transfer agent selected from the group consisting of quaternary ammonium, quaternary phosphonium, and tertiary sulfonium compounds or mixtures thereof. These phase transfer agents are well known and include illustratively "onium compounds" described by C. M. Starks in J.A.C.S. 93, 195 (1971), "crown ethers" described in Aldrichimica ACTA 9, Issue #1 (1976) Crown Ether Chemistry-Principles and Applications, G. W. Gokel and H. D. Durst, as well as C. J. Pederson in U.S. Pat. No. 3,622,577 and "chelated cationic salts" which include alkali or alkaline earth metal diamine halides. Specific illustrative examples are described in U.S. 4,201,721 whose descriptions are incorporated herein in their entity by reference.

Any amount of catalytic phase transfer agent (PTA) can be employed, however generally effective molar proportions of phase transfer agent relative to the amount of water soluble base are within the range of from about 1:10 to about 1:1000 and more frequently within the range of from 1:100 to 1:1000.

The coupling reactions can be carried out at any temperature. Preferably temperatures within the range of from 0° to 150° C. or even higher, and more preferably from 50° C. to 100° C. are employed.

In order that those skilled in the art may better understand my invention, the following examples are given which illustrate the best mode of practicing my invention.

EXAMPLE 1

(A) Preparation of Polyphenylene Oxide 2,6 xylenol was polymerized in accordance with the following procedure:

A 2.5 gallon stainless steel reactor equipped with an air-driven paddle stirrer, oxygen inlet tube, and water-cooled coil and jacket was charged with 3.4 l toluene, 150 g 2,6 xylenol, 10 lml. of a stock catalyst solution, ie. (29.5 ml. bromine added slowly to a chilled solution of 7.76 g. cuprous oxide and 132.0 g. 2,6 xylenol in methanol, then diluted to 1.01.), 3.67 g. N,N'-di(t-butyl)ethylenediamine (DBEDA), 85.4 g. N,N-dimethylbutylamine (DMBA), 15 g. di(n-butyl)amine (DBA) and 1.5 g. tricaprylmonomethylammonium chloride (Adogen 464). Oxygen was bubbled into the resulting admixture at a rate of 5 SCFH while vigorously agitating the admixture, 1350 g. of 2,6 xylenol dissolved in 1.4 l toluene was pumped into the reactor over a 30 minute period. The temperature rose from 25° to 35° C. and was held at 35° C. The polymerization reaction was terminated by adding 15 ml. 38% trisodium ethylenediaminetetraacetate (Na₃EDTA) in water. The resulting reaction mixture was heated at 55° C. under nitrogen for one hour and then the polymer was precipitated by adding three volumes of methanol. The precipitated polymer was filtered and washed with methanol (5 l) yielding a white solid reaction product having an intrinsic viscosity of 0.24 dl./g. measured in chloroform at 25° C. An infrared spectrum of the polymer showed a peak with an absorbance at 3610 cm$^{-1}$ of 0.40.

(B) Preparation of Aromatic Polyformal

A solution of 45.6 parts (0.20 mole) of bisphenol —A in 62 ml. of methylene chloride and 93 ml. of N-methylpyrrolidone (NMP) was stirred vigorously under a nitrogen atmosphere with 16.0 parts (0.50 mole) sodium hydroxide pellets at 80° C. for 5 hours. Additional methylene chloride was added and the mixture was filtered while warm. A mixture of 250 ml. methanol and 250 ml. acetone was added to the filtrate to precipitate the polymer. The polymer was collected on a filter and dried at 60° C. and 10 Torr for 20 hours. The weight of dry polymer was 35.8 g.

The polymer was found to have an intrinsic viscosity of 0.21 dl/g in chloroform at 25° C. The number average molecular weight (Mn) from infrared analysis of hydroxyl end groups was 8150. Using either less sodium hydroxide or less methylene chloride with a similar procedure yielded lower molecular weight polyformal. Thus, with 5% less sodium hydroxide, the polymer had an intrinsic viscosity of 0.08 dl/g in chloroform at 25° C.; Mn was 2560 and $T_g$ was 52° C. With 70% less methylene chloride: [η] 0.13 dl/g, Mn 3770.

EXAMPLES 2–5

A series of copolymers of polyphenylene oxide and aromatic polyformals were prepared utilizing the polyphenylene oxide and the polyformal precursors prepared as described in EXAMPLE 1 above.

A 300 ml. mini-blender was equipped with a nitrogen inlet, a thermocouple near the high shear impeller region of the blender and a port for the introduction of a coupling agent. The blender was charged with polyphenylene oxide (PPO) resin, 20 ml. of chlorobenzene, 0.5 ml. of a 10% (W/V) solution of Aliquat 336 TM (methyl tricaprylammonium chloride), and 50% aqueous sodium hydroxide. The reaction medium was maintained under an inert nitrogen atmosphere at a temperature of approximately 50° C. while the reaction ingredients were premixed vigorously for 2 minutes. Isophthaloyl chloride (IPC) pellets were then added. Within 2 minutes a viscous reaction mixture resulted which was diluted with 20 ml. of chlorobenzene, and added to 300 milliliters of methanol with vigorous stirring. A resulting solid precipitate was filtered, washed with methanol, dried at 80° C. for 20 hours under a vacuum of 10 torr.

Set out in Table I hereinafter is a summary of the reaction parameters including the relative amounts of polyphenylene oxide, polyformal, isophthaloyl chloride phase transfer agent, base and solvent employed in this series as well as the amount and the intrinsic viscosity of the resulting product.

TABLE I

| Example | Reaction No. | PPO (g.) | PF (g.) | PF [η] | PF (Mn) | Aliquat (g) | 50% NaOH (g) | φCl (ml) | IPC (g) | PPO-PF Product (g) | (η) | Tg |
|---|---|---|---|---|---|---|---|---|---|---|---|---|
| 2 | 1 | 5 | 5 | 0.08 | 2560 | .050 | 2.06 | 20 | 1.04 | 8.82 | 0.33 | 81°, * |
| 3 | 2 | " | " | .11 | 3440 | " | 1.66 | " | .84 | 9.65 | .80 | 97°, 202 |
| 4 | 3 | " | " | .13 | 3770 | " | 1.56 | " | .60 | 9.85 | .51 | 96°, * |
| 5 | 4 | " | " | .21 | 8150 | " | .99 | " | .50 | 9.54 | .80 | 96°, * |

*Only the lower transition was measured.

Although the above examples are directed to only a few of the very many variables which can be employed in the practice of the present invention, it should be understood that the present invention is directed to a much broader class of block polymers of polyphenylene oxide and polyformals consisting essentially of chemically coupled units of polyphenylene oxides of formulas (II) and/or (III) and aromatic polyformals of formula (IV). The block copolymers of polyphenylene oxide and aromatic polyformals can be molded, calendered, or extruded as films, sheets, fiber, laminates, or other useful articles of manufacture.

I claim:

1. An acid halide coupled polyphenylene oxide aromatic polyformal block copolymer.

2. A coupled polyphenylene oxide aromatic polyformal block copolymer comprising an acyl radical of the formula:

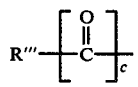

wherein c is a number at least equal to 2, and R''' is $C_{1-8}$ alkylene, $C_{1-8}$ alkenylene, phenylene, halophenylene and $C_{1-18}$ alkyl substituted phenylene; a polyphenylene oxide radical of the formulas:

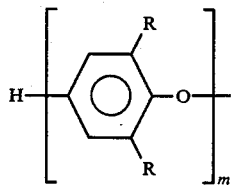

wherein independently each R is hydrogen, a hydrocarbon radical, a halohydrocarbon radical, a hydrocarbonoxy radical or a halohydrocarbonoxy radical, m is a number of at least 1, or

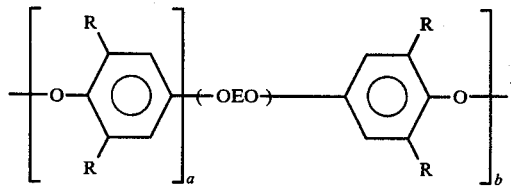

wherein independently each —(OEO)— is a divalent quinone residue, E is a divalent arene radical, either a or b is at least equal to 1, the sum of a plus b is at least equal to 10, R is the same as above, and an aromatic polyformal radical of the formula:

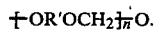

wherein n is an integer at least equal to 1, and R' is a divalent aromatic radical.

3. The claim 2 copolymer where R''' is phenylene, independently each R is hydrogen, a hydrocarbon or a halohydrocarbon radical, and R' is an —R"QR"— radical wherein each R" is a divalent $C_{(6-13)}$ aromatic radical and Q is selected from cyclohexyl, fluorenyl, —O—, —S—,

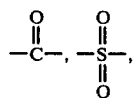

—$C_yH_{2y}$—, y being equal to 1 to 5 inclusive,

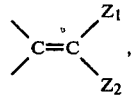

$Z_1$ is selected from hydrogen, chlorine or bromine, and $Z_2$ is selected from chlorine or bromine.

4. The claim 3 copolymer where R''' is phenylene, and —R"QR"— is of the formula:

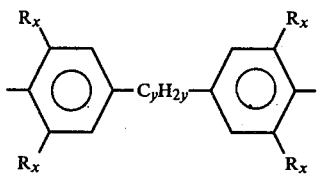

y is 1 to 5, and independently each $R_x$ is hydrogen, a hydrocarbon or a halohydrocarbon radical.

5. The claim 4 copolymer where c is equal to 2, m is 40 to 170, the sum of a plus b is 40 to 170, and n is 10 to 170.

6. The claim 5 copolymer where each $R_x$ is hydrogen.

7. A process of forming a coupled polyphenylene oxide aromatic polyformal copolymer comprising contacting a polyphenylene oxide, a polyformal and a polyacyl halide coupling agent.

* * * * *